2,390,792

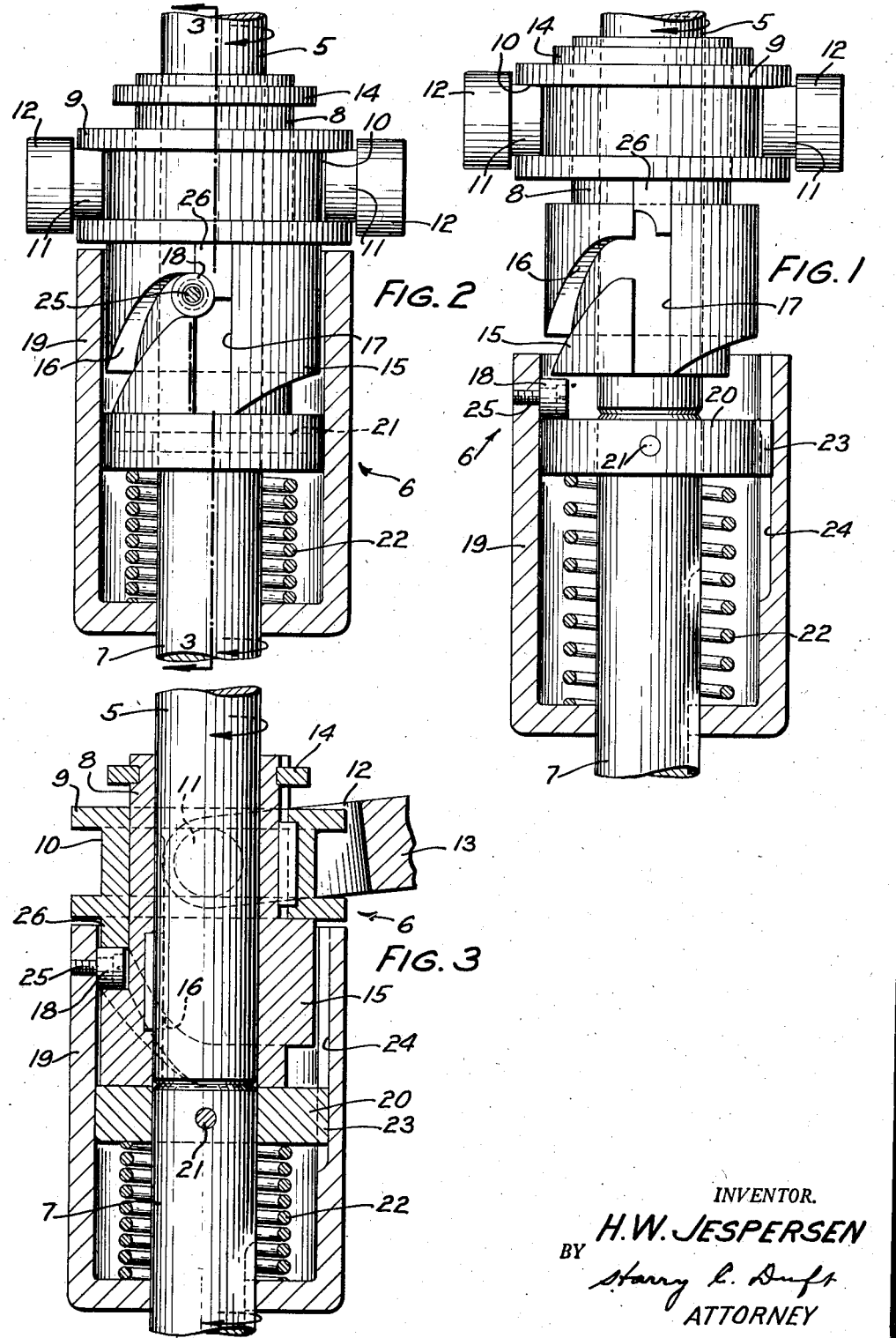
Dec. 11, 1945. H. W. JESPERSEN 2,390,792
POWER TRANSMISSION DEVICE
Filed Dec. 4, 1943
INVENTOR.
H. W. JESPERSEN
BY Harry R. Duft
ATTORNEY Patented Dec. 11, 1945

UNITED STATES PATENT OFFICE 2,390,792

POWER TRANSMISSION DEVICE

Helgo W. Jespersen, Western Springs, Ill., assignor to Western Electric Company, Incorporated, New York, N. Y., a corporation of New York Application December 4, 1943, Serial No. 512,935

13 Claims. (Cl. 192—67)

This invention relates to power transmission devices and more particularly to a yieldably engageable positive clutch.

In some types of power operated mechanisms, it is desirable to employ a constantly driven power shaft which may be intermittently drivably connected to the mechanism to be operated through a clutch. Where it is, in addition, desirable that the rotation of the driven shaft be begun gradually, various means have been employed to effect a gradual engagement of the clutch members. Perhaps the most commonly employed expedient is the friction clutch wherein the opposing faces of the clutch are engaged one with the other under gradually increasing pressures to reduce the slippage therebetween until the clutch members are rotating in unison. However, such clutches are obviously subjected to considerable wear in use and also are difficult to adjust to provide a uniformly increasing degree of engagement. Furthermore, the drive is never absolutely positive as there may be some slippage.

An object of the present invention is to provide an efficient and effective yieldably engageable positive clutch.

In accordance with one embodiment of this invention, a yieldably engageable positive clutch may be provided having a sleeve keyed to the power shaft and provided with a spiral slot which is engageable with a pin associated with the shaft to be driven. The movement of the pin through the slot compresses a spring and applies thereby a gradually increasing driving torque to the driven shaft until the pin reaches the end of the slot after which the drive is positive. A removable stop at the end of the slot allows the pin to move along an axial slot for disengaging it.

Other objects and advantages of the present invention will be more apparent from the following description taken in conjunction with the drawing, wherein Fig. 1 is a fragmentary side view, partly in section, showing a clutch and associated shafts constructed in accordance with this invention, the clutch being shown in disengaged relation;

Fig. 2 is a view similar to Fig. 1, except showing the clutch in fully engaged relation; and Fig. 3 is a vertical sectional view along the line 3—3 of Fig. 2.

Referring now to the drawing, a power shaft 5 is there illustrated, which may be driven by any suitable means and which is connectible through a clutch mechanism designated generally as 6 to a second shaft 7 in axial alignment therewith and which is to be driven thereby. As shown in the drawing, the ends of the two shafts 5 and 7 substantially meet. A sleeve 8 is keyed to the lower portion of the power shaft 5 and is axially movable therealong by a collar 9 which is provided with a peripheral groove 10 in which is positioned a pair of lugs 11, the collar 9 being disposed about the upper portion of the sleeve 8. These lugs are fixed to the lower ends 12 of a fork-shaped member 13 shown fragmentarily, such as is commonly used for operating this type of clutch. The collar 9, which is keyed to the sleeve 8, as will be hereinafter explained, is axially movable on the sleeve, the upper end of the sleeve 8 being enlarged to provide a flange 14 to retain the collar 9 thereon. The lower portion of this sleeve is also substantially enlarged to provide a shouldered portion 15 in which is formed a spiral slot or groove 16. The upper end of this groove terminates in the upper portion of a groove 17 which extends longitudinally across the shoulder 15, as shown in Fig. 1.

By moving the sleeve downward, as viewed in the drawing, this being effected by shifting the fork 13 to move the collar 9 downwardly, a roller 18, rotatably mounted on a cylindrical housing 19 which is positioned about the driven shaft 7, may be caused to enter the spiral groove 16. The interior diameter of the housing 19 is slightly greater than the diameter of the shouldered portion 15 to permit the housing to move over this portion of the sleeve, as shown in Fig. 2. Since the shaft 5 on which the sleeve 8 is mounted and to which it is keyed is rotating, whereas the shaft 7 on which the housing is mounted is stationary, the rotation of the sleeve 8 with respect to the housing 19 causes the roller 18 to move along the spiral slot and to pull the housing 19 over the lower portion of the sleeve 8. The movement of the housing 19 over the sleeve 8, however, is resisted by an annular member 20 which is positioned about the upper end of the shaft 7 and connected thereto by a pin 21 which extends transversely through the member 20 and the shaft 7. This member 20 serves both to retain a helical spring 22, which presses the member 20 upward and which is positioned about the shaft 7 in the housing 19, and also to connect the shaft 7 drivably to the housing 19. This connection is effected by a projecting lug 23 integrally formed at the outer edge of a portion of the member 20 which extends into a slot 24 formed in the inner surface of the housing 19, as shown.

As the roller enters the spiral groove 16, it tends to run the length of the groove, as may be understood, but in order for the roller to move the length of the groove, it must force the cylindrical housing 19 over the sleeve 8 against the pressure of the spring 22. Thus, as the roller 18 enters the spiral groove 16, the roller being rotatably mounted on a stud shaft 25 threaded into and extending from the inner side of the housing 19, the sleeve 8 pulls the housing 19 upward, the lower end of the sleeve bearing against the member 20. The housing is thus lifted upward against the pressure of the helical spring 22, thereby applying a gradually increasing driving torque to the shaft 7. The size of the spring 22 is selected so that by the time the roller 18 reaches the end of the groove 16, the torque applied by virtue of the resistance offered by the spring 22 is substantially sufficient to cause the shaft 7 to rotate in unison with the shaft 5.

As the collar 9 is moved downward relatively to the sleeve 8 to engage the spiral groove 16 with the roller 18, during the initial portion of this movement, a stop member 26, fixed to the lower side of the collar and disposed in the upper portion of the groove 17, as shown in Fig. 1, is advanced in the groove 17 to the position shown in Fig. 2. In this advanced position, the stop member 26 prevents the roller 18 from leaving the spiral groove 16 and moving into the axial or longitudinal groove 17. After the roller 18 has engaged the stop member 26, the connection between the clutch members is no longer yieldable but is positive and remains so until the stop member is withdrawn. When it is desired to disengage this clutch, the collar 9 is moved upward against the flange 14, thereby removing the stop member 26 from the end of the groove 16 and permitting the roller 18 to move into the groove 17. Continued upward movement of the collar 9 lifts the sleeve 8 and moves it upward relatively to the housing 19 and to the roller 18. As the sleeve reaches its upper position, the roller 18 is completely freed from the groove 17 and the clutch is then in disengaged relation, as shown in Fig. 1.

An important feature of the present invention is that by reason of the design employed, the drive shaft 5 will always engage the driven shaft 7 in the same relative position. This is effected by the use of the single engaging surface and the single engaged member, that is the roller 18. In addition, this clutch provides an initially yielding engagement, that is to say, a low initial torque which gradually increases until the roller 18 encounters the stop member 26, after which the engagement is absolutely positive.

While but one embodiment of the present invention has been shown and described, it will be understood that many changes and modifications may be made therein without departing from the spirit and scope of the present invention.

What is claimed is:

1. In a power transmission device having a power shaft and a second shaft to be driven thereby, a sleeve associated with said power shaft and rotated thereby having a spiral groove formed in the surface thereof, a member associated with said second shaft and receivable in said spiral groove, means for causing said member to enter said groove, and yieldable means associated with said second shaft for resisting the movement of said member along said groove to cause a gradually increasing torque to be applied to said second shaft as said member enters said groove, said sleeve having a second groove formed therein and extending longitudinally thereof so as to intersect the inner end of said spiral groove to permit said sleeve to be withdrawn from said member.

2. In a power transmission device having a power shaft and a second shaft to be driven thereby, a sleeve associated with said power shaft and rotated thereby having a spiral groove formed in the surface thereof, a member associated with said second shaft and receivable in said spiral groove, means for causing said member to enter said groove, yieldable means associated with said second shaft for resisting the movement of said member along said groove to cause a gradually increasing torque to be applied to said second shaft as said member enters said groove, said sleeve having a second groove formed therein and extending longitudinally thereof so as to intersect the inner end of said spiral groove to permit said sleeve to be withdrawn from said member, and means insertable in said longitudinally extending groove for retaining said member substantially in said spiral groove.

3. A power transmission device having a power shaft and a second shaft to be driven thereby, a sleeve keyed to said power shaft and axially movable therealong, a cylindrical housing associated with said second shaft, said sleeve being receivable in said housing, a helical spring positioned within said housing and disposed about said shaft for resisting the movement of said sleeve into said housing, means fixed to said second shaft for retaining said spring in said housing, means associated with said retaining means for causing said housing to be rotated with said shaft, said sleeve having a spiral groove formed therein, a member rotatably mounted on said housing and engageable with said spiral groove, and means for moving said sleeve relatively to said power shaft to cause said member to enter said groove.

4. A power transmission device having a power shaft and a second shaft to be driven thereby, a sleeve keyed to said power shaft and axially movable therealong, a cylindrical housing associated with said second shaft, said sleeve being receivable in said housing, a helical spring positioned within said housing and disposed about said shaft for resisting the movement of said sleeve into said housing, means fixed to said second shaft for retaining said spring in said housing, means associated with said retaining means for causing said housing to be rotated with said shaft, said sleeve having a spiral groove formed therein, a member rotatably mounted on said housing and engageable with said spiral groove, and means for moving said sleeve relatively to said power shaft to cause said member to enter said groove, said sleeve having a second groove formed therein and extending longitudinally therealong so as to intersect the inner end of said spiral groove to permit said sleeve to be withdrawn from said member.

5. A power transmission device having a power shaft and a second shaft to be driven thereby, a sleeve keyed to said power shaft and axially movable therealong, a cylindrical housing associated with said second shaft, said sleeve being receivable in said housing, a helical spring positioned within said housing and disposed about said shaft for resisting the movement of said sleeve into said housing, means fixed to said second shaft for retaining said spring in said housing, means associated with said retaining means for causing said housing to be rotated with said shaft, said sleeve having a spiral groove formed therein, a member rotatably mounted on said housing and engageable with said spiral groove, means for moving said sleeve relatively to said power shaft to cause said member to enter said groove, said sleeve having a second groove formed therein and extending longitudinally thereof so as to intersect the inner end of said spiral groove to permit said sleeve to be withdrawn from said member, and means insertable in said longitudinally extending groove for retaining said member substantially in said spiral groove.

6. A power transmission device having a power shaft and a second shaft driven thereby, said power shaft having a spiral passage formed along the periphery thereof, a member associated with said second shaft and receivable in said spiral passage, means for causing said member to enter said passage, resilient means for increasingly resisting the movement of said member along said passage to cause a gradually increasing torque to be applied to said second shaft as said member moves along said passage, and a removable stop member at the end of said passage.

7. A power transmission device having a power shaft and a second shaft driven thereby, said power shaft having a spiral passage formed along the periphery thereof, a member associated with said second shaft and receivable in said spiral passage, means for causing said member to enter said passage, resilient means for increasingly resisting the movement of said member along said passage to cause a gradually increasing torque to be applied to said second shaft as said member moves along said passage, and a removable stop member at the end of said passage, said power shaft having a second passage to permit said member to be removed from said passages when said stop member is removed from the end of said spiral passage.

8. A power transmission device having a power shaft and a second shaft driven thereby, a member rotatable with one of said shafts, a sleeve rotatable with the other of said shafts and having a cam groove open at each end for receiving and advancing said member, means for causing said member to enter said groove, means for stopping said member in an advanced position in said groove, resilient means for resisting the movement of said member along said groove to cause a gradually increasing torque to be applied to said second shaft and means for moving said stopping means to disconnect the power to said driven shaft.

9. A power transmission device having a power shaft and a second shaft to be driven thereby, a sleeve rotatable with one of said shafts and having a helical groove formed in the surface thereof, a member rotatable with the other of said shafts and engageable in said helical groove, said helical groove being less than one complete convolution and having a relatively steep pitch whereby the member is advanced axially in said groove substantially the same distance as it moves arcuately in said groove, means for causing said member to enter said groove, and resilient means for resisting the movement of said member along said groove to cause a gradually increasing torque to be applied to the driven shaft as said member advances in said groove.

10. A power transmission device having a power shaft and a second shaft to be driven thereby, a member rotatable with one of said shafts, a cam member rotatable with the other of said shafts and having an inclined portion for advancing said member, means for causing said member to engage said cam, means for increasingly resisting the movement of said member along said cam to cause a gradually increasing torque to be applied to said second shaft, a removable stop member for stopping said member in an advanced position on said cam, and means for retracting said stop member.

11. A power transmission device having a power shaft and a second shaft to be driven thereby, one of said shafts having a retractible abutment and a helical cam surface of less than one convolution, the other shaft having a member rotatable therewith, said member being directed into engagement with said abutment by said cam surface to effect a driving connection between the two shafts, means for causing the engagement of said member with said cam surface, and resilient means for resisting the movement of said member along said cam surface to cause a gradually increasing torque to be applied to the driven shaft, and means for retracting the abutment, said cam surface being shaped to permit an axial disengagement of the driving connection between the two shafts.

12. A power transmission device having a power shaft and a second shaft to be driven thereby, one of said shafts having a retractible abutment and an inclined cam surface, the other shaft having a member rotatable therewith and engageable with said abutment, means for causing the engagement of said member with said cam surface to cause a relative movement between said member and said cam surface to effect an engagement of the member with said abutment, and means for resisting said relative movement to cause a gradually increasing torque to be applied to said driven shaft until said member engages said abutment, said first means being actuatable for retracting said abutment to disengage the power from said driven shaft.

13. A power transmission device having a power shaft and a second shaft to be driven thereby, a retractible abutment on one of said shafts, a member on the other of said shafts engageable with said abutment to effect a driving connection between said shafts, means for directing said member into engagement with said abutment, means for causing said member to engage said directing means, resilient means cooperating with said directing means for resisting movement of said member into engagement with the abutment to cause an increasing torque to be applied to said driven shaft until said member engages the abutment, and means for retracting said abutment to disconnect the power to said driven shaft.

HELGO W. JESPERSEN.